(12) United States Patent
Kilper (10) Patent No.: US 10,263,722 B2
(45) Date of Patent: Apr. 16, 2019

(54) MULTI-WAVELENGTH BALANCED OPTICAL TRANSMISSION NETWORKS

(71) Applicant: Arizona Board of Regents on Behalf of the University of Arizona, Tucson, AZ (US)

(72) Inventor: Daniel Kilper, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 186 days.

(21) Appl. No.: 15/519,400

(22) PCT Filed: Oct. 14, 2015

(86) PCT No.: PCT/US2015/055466
§ 371 (c)(1),
(2) Date: Apr. 14, 2017

(87) PCT Pub. No.: WO2016/061183
PCT Pub. Date: Apr. 21, 2016

(65) Prior Publication Data
US 2017/0244510 A1  Aug. 24, 2017

Related U.S. Application Data

(60) Provisional application No. 62/063,889, filed on Oct. 14, 2014.

(51) Int. Cl.
*H04B 10/00* (2013.01)
*H04J 14/02* (2006.01)
(Continued)

(52) U.S. Cl.
CPC ........ *H04J 14/0212* (2013.01); *H04B 10/516* (2013.01); *H04J 14/0221* (2013.01); *H04Q 11/0005* (2013.01); *H04Q 2011/0016* (2013.01)

(58) Field of Classification Search
CPC .................. H04B 10/516; H04J 14/0221
See application file for complete search history.

(56) References Cited

U.S. PATENT DOCUMENTS 6,049,414 A   4/2000  Espindola et al.
6,147,796 A  11/2000  Ma et al.
(Continued)

FOREIGN PATENT DOCUMENTS

EP   0837575 A2   4/1998

OTHER PUBLICATIONS

International Search Report dated Feb. 2, 2016, issued in connection with International Application No. PCT/US2015/055466 (2 pages total).

(Continued)

*Primary Examiner* — Daniel G Dobson
(74) *Attorney, Agent, or Firm* — Stuart H. Mayer; Mayer & Williams PC (57) ABSTRACT

A method for transmitting data over an optical communication system is performed by sequentially tuning a laser beam among a plurality of optical wavelengths. At least one data signal is modulated onto the plurality of optical wavelengths by sequentially switching the modulation of the data signal among the plurality of optical wavelengths such that at any given time the data signal is only modulated onto a single one of the optical wavelengths. The sequential switching is performed at a rate equal to or greater than a response time of one or more optical amplifiers used for amplifying the optical wavelengths.

27 Claims, 11 Drawing Sheets

(51) Int. Cl.
*H04B 10/516* (2013.01)
*H04Q 11/00* (2006.01)
*H04J 14/00* (2006.01)

(56) References Cited

U.S. PATENT DOCUMENTS

| | | | |
|---|---|---|---|
| 6,212,001 | B1 | 4/2001 | Bode et al. |
| 7,110,671 | B1 * | 9/2006 | Islam ................ H04Q 11/0005 398/49 |
| 8,639,069 | B1 | 1/2014 | Helkey et al. |
| 9,065,565 | B2 | 6/2015 | Martinelli et al. |
| 2001/0038488 | A1 | 11/2001 | Kinoshita |
| 2002/0181045 | A1 | 12/2002 | Uda |
| 2003/0106990 | A1 | 6/2003 | Tomofuji et al. |
| 2003/0227948 | A1 * | 12/2003 | Rice .................... H01S 3/06754 372/6 |
| 2004/0165888 | A1 | 8/2004 | Gerstel |
| 2004/0190595 | A1 | 9/2004 | Litvin |
| 2006/0193632 | A1 | 8/2006 | Risbood |
| 2008/0085115 | A1 | 4/2008 | Turukhin et al. |
| 2009/0232499 | A1 | 9/2009 | Sarashina et al. |
| 2009/0300438 | A1 | 12/2009 | Sadananda et al. |
| 2010/0142943 | A1 | 6/2010 | Frankel et al. |
| 2011/0172646 | A1 | 7/2011 | Elmouelhi et al. |
| 2011/0262413 | A1 | 10/2011 | Ji et al. |
| 2011/0274434 | A1 | 11/2011 | Cunningham et al. |
| 2013/0138250 | A1 | 5/2013 | Mowery et al. |
| 2013/0148961 | A1 | 6/2013 | Fujita et al. |
| 2013/0195462 | A1 | 8/2013 | Ghioni et al. |
| 2013/0266316 | A1 | 10/2013 | Xia |
| 2014/0016934 | A1 | 1/2014 | Xu et al. |
| 2014/0241721 | A1 | 8/2014 | Xia et al. |
| 2017/0223438 | A1 * | 8/2017 | Detwiler ............ H04Q 11/0067 |

OTHER PUBLICATIONS

Written Opinion dated Feb. 2, 2016, issued in connection with International Application No. PCT/US2015/055466 (11 pages total).

* cited by examiner

MULTI-WAVELENGTH BALANCED OPTICAL TRANSMISSION NETWORKS

CROSS REFERENCE TO RELATED APPLICATION

This is a National Phase in the United States of PCT/US2015/055466, filed Oct. 14, 2015, which application claims the benefit of U.S. Provisional Application Ser. No. 62/063,889, filed Oct. 14, 2014, entitled "Multi-Wavelength Balanced Optical Transmission Networks", the contents of which is incorporated herein by reference in its entirety.

GOVERNMENT FUNDING

This invention was made with government support under Grant No. EEC0812072 awarded by NSF. The government has certain rights in the invention.

BACKGROUND

Wavelength division multiplexing (WDM) is one technique used to increase the capacity of optical transmission systems. A wavelength division multiplexed optical transmission system employs plural optical channels, each channel being assigned a particular channel wavelength. In a WDM system, optical wavelengths are generated, each of which is modulated with a different data signal. The modulated wavelength may be referred to hereinafter as an optical signal. The modulated optical wavelengths (i.e., the optical signals) are multiplexed to form a WDM optical signal that can be transmitted over an optical fiber transmission path and demultiplexed such that each channel wavelength is individually routed to a designated receiver. Through the use of optical amplifiers plural optical wavelengths can be directly amplified simultaneously, facilitating the use of wavelength division multiplexing in long-distance optical systems.

Optical add drop nodes located along the transmission path can add and remove data signals onto one or more wavelengths without requiring the termination of the other data signals on other wavelengths passing through the nodes—this is sometimes referred to as a transparent optical add drop node. In one transparent node, referred to as a reconfigurable optical add drop multiplexing (ROADM) node, multiple fibers in and out of the node can be supported and the different data signals can be selectively added or dropped or sent to different fibers based on the setting of an optical switch in the node.

For a so-called colored optical add drop node, the transceivers that generate the optical signals are connected to an add or drop port that only accepts data signals of a particular wavelength or set of wavelengths. Thus, the signal wavelength and band, although it may initially be tuned to match that fixed color input, becomes rigidly set in place once connected to the port. This approach has been widely used in the past, largely due to cost considerations. Recently, so-called colorless node techniques have been introduced. The optical ports for this type of node can accept any wavelength or set of wavelengths. Systems have been described in which a data signal that has been modulated onto one wavelength at its transceiver source is moved to a new wavelength in order to accommodate a new routing plan or network failure, for example. Changing the network configuration in this way, however, often has to be done very slowly in order to avoid disrupting data signals on other wavelengths. This is because the optical signals interact through the amplifiers and the nonlinear characteristics of the optical fiber. Furthermore, in normal operation the optical signals need to be repeatedly tuned and carefully adjusted in power as the properties of the fiber, amplifiers, and other components drift over time. When new optical signals are added to the network or any similar changes made, the adjustments likewise need to be done slowly and carefully. When a fiber break occurs the optical signals often experience power excursions that persist over long periods of time until the system controls can be adjusted to compensate and find the new operating points.

SUMMARY

Described herein is an optical transmission or communication system in which each individual data signal is sequentially and repetitively switched so that it is modulated onto different wavelengths on a time scale that is faster than the response time of the optical amplifiers employed in the system. The data signal is only modulated onto a single wavelength at any given time.

In accordance with one particular aspect of the invention, a method for transmitting data over an optical communication system is performed by sequentially tuning a laser beam among a plurality of optical wavelengths. At least one data signal is modulated onto the plurality of optical wavelengths by sequentially switching the modulation of the data signal among the plurality of optical wavelengths such that at any given time the data signal is only modulated onto a single one of the optical wavelengths. The sequential switching is performed at a rate equal to or greater than a response time of one or more optical amplifiers used for amplifying the optical wavelengths.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

As detailed below, an optical transmission or communication system is described herein in which each individual data signal is switched to different wavelengths within the optical spectrum. This is counter intuitive since the data signals are usually very carefully maintained at a constant wavelength and one attempts to avoid disrupting the system as much as possible. Switching the wavelength onto which the data signal is modulated can cause disturbances to the system that become worse as the size of the network (e.g., the number of nodes and/or amplifiers) and transmission distances become larger.

In one aspect, a data signal to be transmitted over a transmission fiber is sequentially and repetitively switched so that it is modulated onto different wavelengths at its source on a time scale that is faster than the response time of the optical amplifiers employed in the system. For instance, one commonly used type of amplifier, an erbium doped fiber amplifier, responds on a time scale slower than a microsecond. Accordingly, the data signal may be switched to different wavelength positions within the optical spectrum on time scales that are faster than the optical amplifier response time. By switching the data signal in this manner, the optical amplifier acts as a low pass filter with respect to the wavelengths onto which the data signal is modulated. Accordingly, the modulated optical signals each appear to the optical amplifier as having a constant value (a constant average power) at each of the wavelength positions to which the data signal is switched. Of course, the time scale over which the data signal needs to be switched will depend on the particular type of optical amplifier that is employed, which is not limited to erbium doped fiber amplifiers or even other types of rare-earth doped optical amplifiers. Moreover, in some implementations the rate at which the data signal is switched to different wavelengths may be equal to or even less than, but a substantial fraction of, the response time of the optical amplifier. For instance, in some cases the switching rate may be as slow as ½ or ¼ of the amplifier response time.

Figure 1:
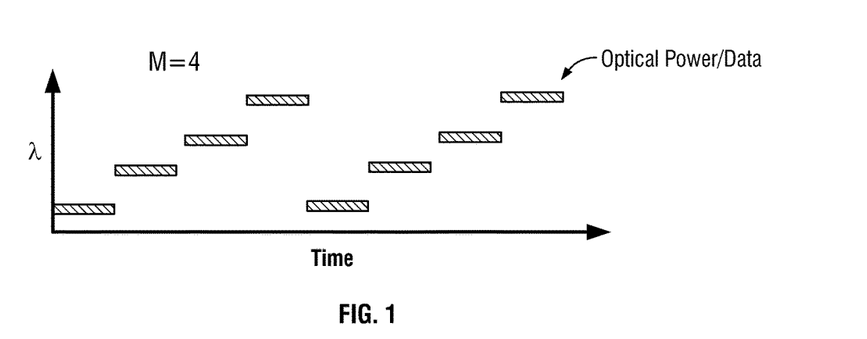
FIG. 1 is a graph showing a data signal being modulated onto 4 optical wavelengths as a function of time.

For example, a wavelength generated by a laser may be initially modulated with a data signal, after which the data signal may be switched among four different wavelength positions in the optical spectrum. For example, FIG. 1 is a graph showing a data signal being modulated onto M wavelengths as a function of time, where in this example M=4. The laser spends, say, 0.250 microseconds at each of these positions and thus is never away from any single wavelength position for more than 0.75 microseconds. Erbium doped fiber amplifiers do not respond fast enough to detect this fast change and therefore will treat the laser as four separate signals, each having an average power reduced to ¼ of the power it would otherwise receive if the data signal were only modulated onto a single wavelength in the conventional manner. It has previously been shown that if multiple optical signals are present in a system, and in particular if they can be spread across the amplifier bandwidth, the amount of power fluctuations and disruptions that they experience is greatly reduced. In fact, if they are placed at strategic locations across the spectrum, then most fluctuations can be almost completely removed, particularly in response to fiber breaks or changes in the wavelength routing. An algorithm based on the amplifier properties such as the gain spectrum may be used to select the multiple wavelength positions. This algorithm can be designed to select wavelength positions that balance the optical power excursions that may occur when the wavelength configuration in the system is changed.

Another benefit of the approach described herein is that much of the complication associated with adjusting the optical powers comes from accommodating the wide range of different wavelength configurations that might be present at different locations in a system—this can be from one wavelength to all wavelengths (often more than 80). By distributing the power of each data signal over the optical spectrum using laser tuning, the range of different wavelength configurations can be greatly reduced. If, for example, the data signal is distributed over 4 wavelengths, the number of different wavelengths employed ranges from 4 to the maximum, rather than 1 to the maximum, and the number of possible configurations or locations in the spectrum that these optical signals may occupy is reduced accordingly. With these four wavelengths distributed across the spectrum, the range of any variations due to wavelength dependent differences arising during transmission of the optical signal is also reduced since the optical signals are not concentrated at one particular location in the spectrum, thus averaging over the wavelength dependence. Previous studies have shown that concentrating power at a particular location in the spectrum in this way can be particularly problematic.

In some embodiments, the transmission system described herein may employ colorless add drop nodes together with the fast wavelength tuned optical signals. If the nodes are 'colored' then the wavelength of the optical signals are limited in the positions to which they can be tuned. Thus, by using colorless add drop nodes a single data signal can be tuned to multiple wavelength positions without being obstructed. Furthermore these colorless nodes enable optical signals to be routed or switched along different paths through the network.

Figure 2:
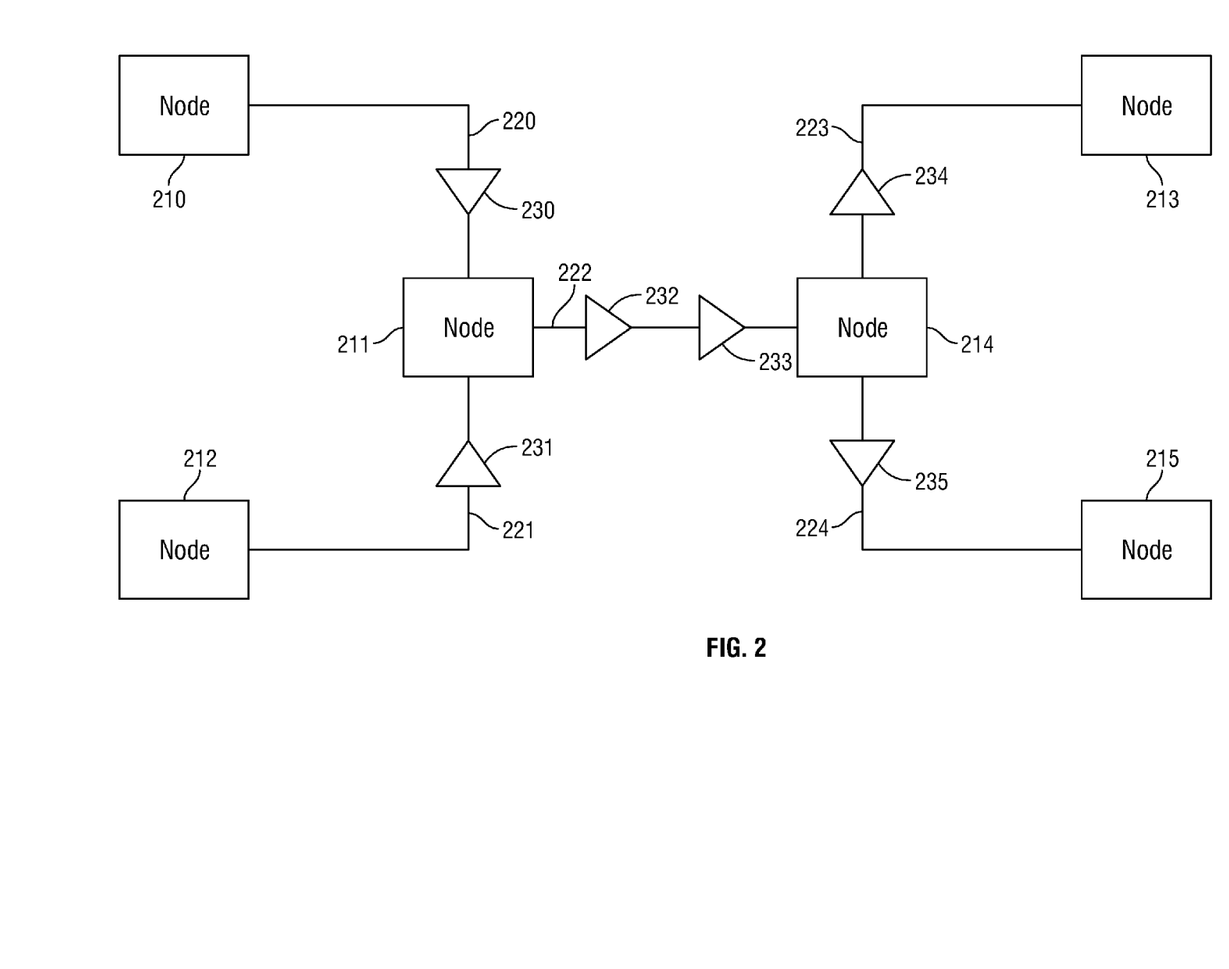
FIG. 2 shows one example of a WDM transmission network.

FIG. 2 shows one example of a WDM transmission network 200 that may incorporate the methods, techniques and systems described herein. WDM transmission network 200 includes network nodes 210-215. Each node is connected to at least one other node by optical links 220-224, which may comprise optical fibers through which the WDM signals propagate. For example, node 210 is connected to node 211 by link 220, and node 211 is connected to node 212 by link 221. In addition, node 211 is connected to node 214 by link 222, and node 214 is connected to node 213 by link 223. Further, node 214 is connected to node 215 by link 224. Each link may include one or more optical amplifiers 230-235 for amplifying the WDM signals. For example, links 220, 221, 223 and 224 respectively include optical amplifiers 230, 231, 234 and 235. Likewise, link 222 includes optical amplifiers 232 and 233. Information is transmitted and received over WDM transmission network 200 by modulation of one or more optical wavelengths to encode data onto the wavelengths. The various modulated optical wavelengths are combined into a single WDM signal that is transmitted over transmission links.

WDM transmission network may comprise a point-to-point optical network with terminal nodes, a ring optical network, a mesh optical network, or any other suitable optical network or combination of optical networks. The number of nodes and optical links shown in FIG. 2 is exemplary and provided for simplicity of illustration.

Optical amplifiers 230-235 may be any suitable type of all-optical amplifier (i.e, an amplifier without any optical to electrical conversion). For example, optical amplifiers may be rare-earth doped optical amplifiers such as erbium doped optical amplifiers or Raman optical amplifiers. The optical amplifiers employed in any given transmission network may all be of the same type or different types.

Figure 3:
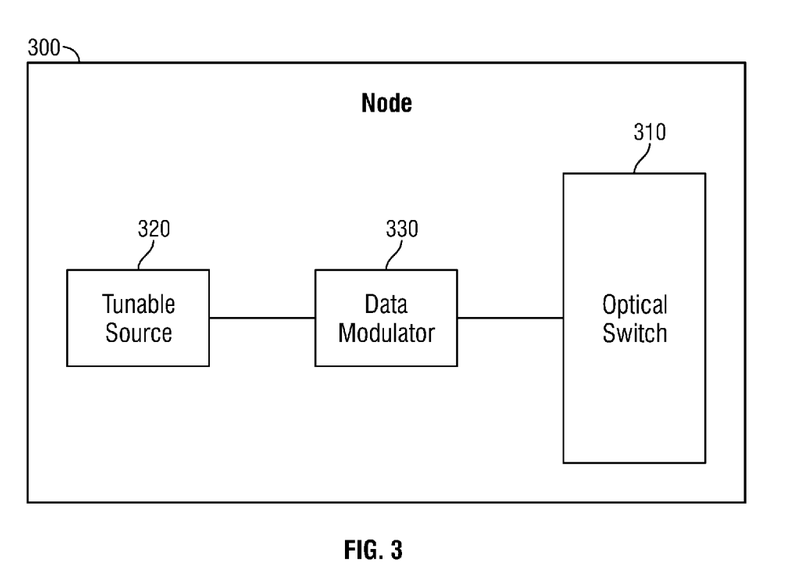
FIG. 3 shows one example of an exemplary optical node that may be employed in the network of FIG. 2.

FIG. 3 shows one example of an exemplary optical node in more detail. Node 300 generally includes an optical switch 310 such as an optical crossconnect or an optical add/drop multiplexer (OADM), for example. In one embodiment the optical switch employs an OADM that is reconfigurable, i.e., the optical switch is a reconfigurable OADM (ROADM). A tunable optical source such as a tunable laser 320 (e.g., a Distributed Feedback (DFB) laser, an External-Cavity Laser (ECL), a Sampled Grating Distributed Bragg Reflector (SGDBR) laser, etc.) generates the optical wavelengths onto which data is to be modulated. Data modulator 330 modulates the individual wavelengths with the data. Data modulator 330 may employ any suitable modulation format. For example, modulation may be imparted in terms of a constellation (e.g., binary, quaternary, 8-ary, 16-ary, higher order constellations, etc.) using any manner of modulation (e.g. intensity, phase, frequency, polarization). An illustrative optical modulator that may be employed is a Mach-Zehnder modulator, for example.

Figure 4:
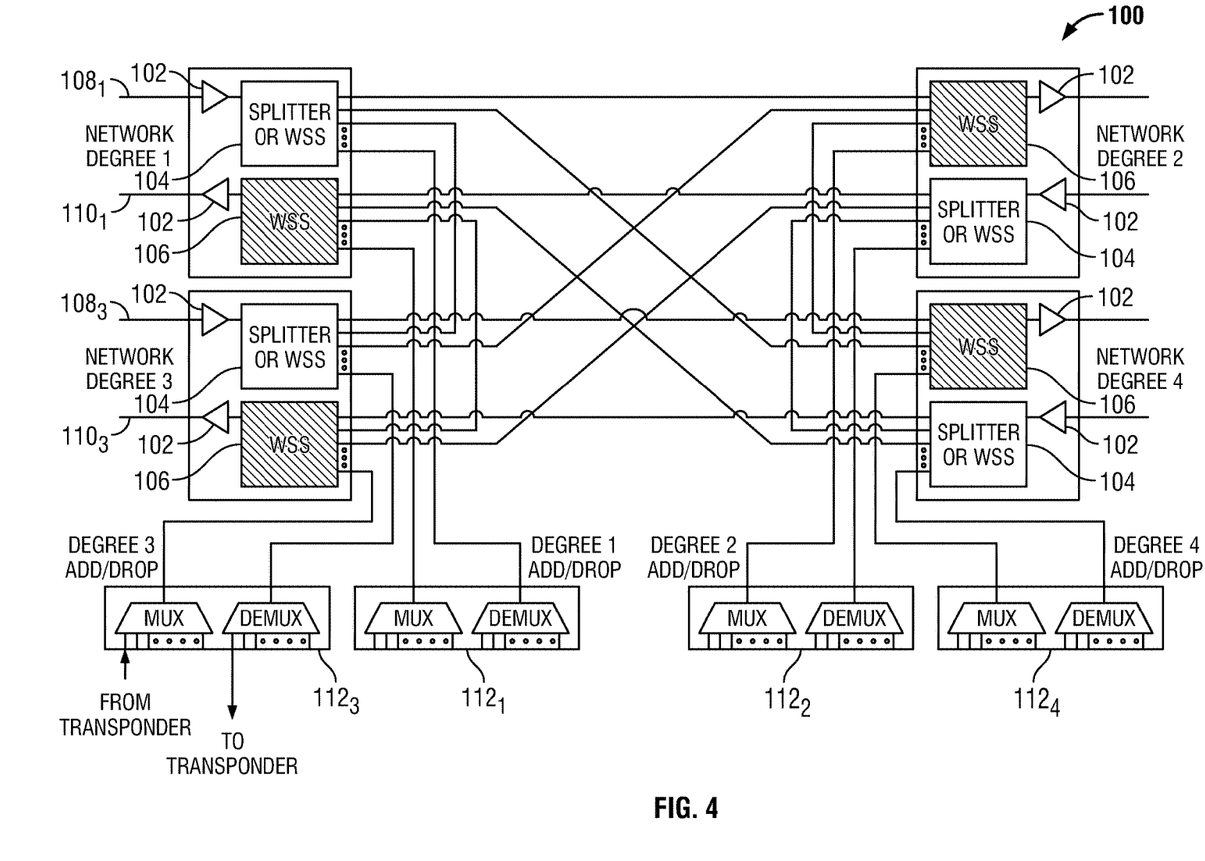
FIG. 4 is a schematic diagram of one illustrative example of an optical switch that may be employed in the optical node shown in FIG. 3.

FIG. 4 is a schematic diagram of one illustrative example of an optical switch that may be employed in the optical node 300 shown in FIG. 3. In this example the optical switch is a ROADM. ROADM 100 may include a colorless (e.g., any wavelength to any add/drop port), a directionless (e.g., any wavelength to any degree), a contentionless (e.g., any combination of wavelengths to any degree from any port), and/or a gridless (e.g. no fixed frequency) architecture. ROADM 100 may support any portion of the optical spectrum provided by the optical network, any channel bit rate, and/or any modulation format. In the example shown in FIG. 4 the ROADM is multi-degree and has a colorless architecture. Each network degree is coupled to a pair of optical amplifiers 102, with an input connected to a 1×N optical fan-in device, e.g., a power splitter (PS) or wavelength selective switch (WSS) 104), and an output connected to a N×1 optical fan-out device, i.e., WSS 106. Multiplexed optical signals on input port $108_1$ from network degree 1 are selectively directed via PS/WSS 104 to WSSs 106 and associated output ports $110_2$, $110_3$ and/or $110_4$ for network degrees 2, 3 and/or 4, respectively. In the same manner, multiplexed optical signals on input ports $108_2$, $108_3$ and $108_4$ (network degrees 2, 3 and 4) may be similarly routed to the other network degrees of the system. The input ports 108 and output ports 110 serve as the line ports of the optical system node 100. A plurality of multiplexer/demultiplexer assemblies $112_1$, $112_2$, $112_3$, and $112_4$ are connected to the WSSs 106 and PS/WSSs 104 for locally adding/dropping wavelengths from client side ports to/from each network degree 1, 2, 3 and 4 by WSSs 106 and PC/WSSs 104.

The use of fast laser tuning to distribute the power of a single optical signal over M wavelength positions will be illustrated with reference to the simplified optical transmission system 400 shown in FIG. 5, which in some embodiments may incorporate any combination of the features, functionality and components discussed above in connection with FIGS. 2-4. In this simplified example optical transmission system 400 includes transmitting node 410 and receiving nodes 420 and 430. More generally, of course, optical transmission system 400 may include any number of nodes, any of which may be both transmitting and receiving nodes, or, as shown, either a transmitting or receiving node. As shown, transmitting node 410 includes tunable source 412, data modulator 414 and a colorless optical switch for transmitting the modulated optical signals over the transmission links as a WDM signal. Likewise, receiving node 420 includes colorless optical switch 422 and receiver 424 and receiving node 430 includes colorless optical switch 432 and receiver 434.

Figure 5:
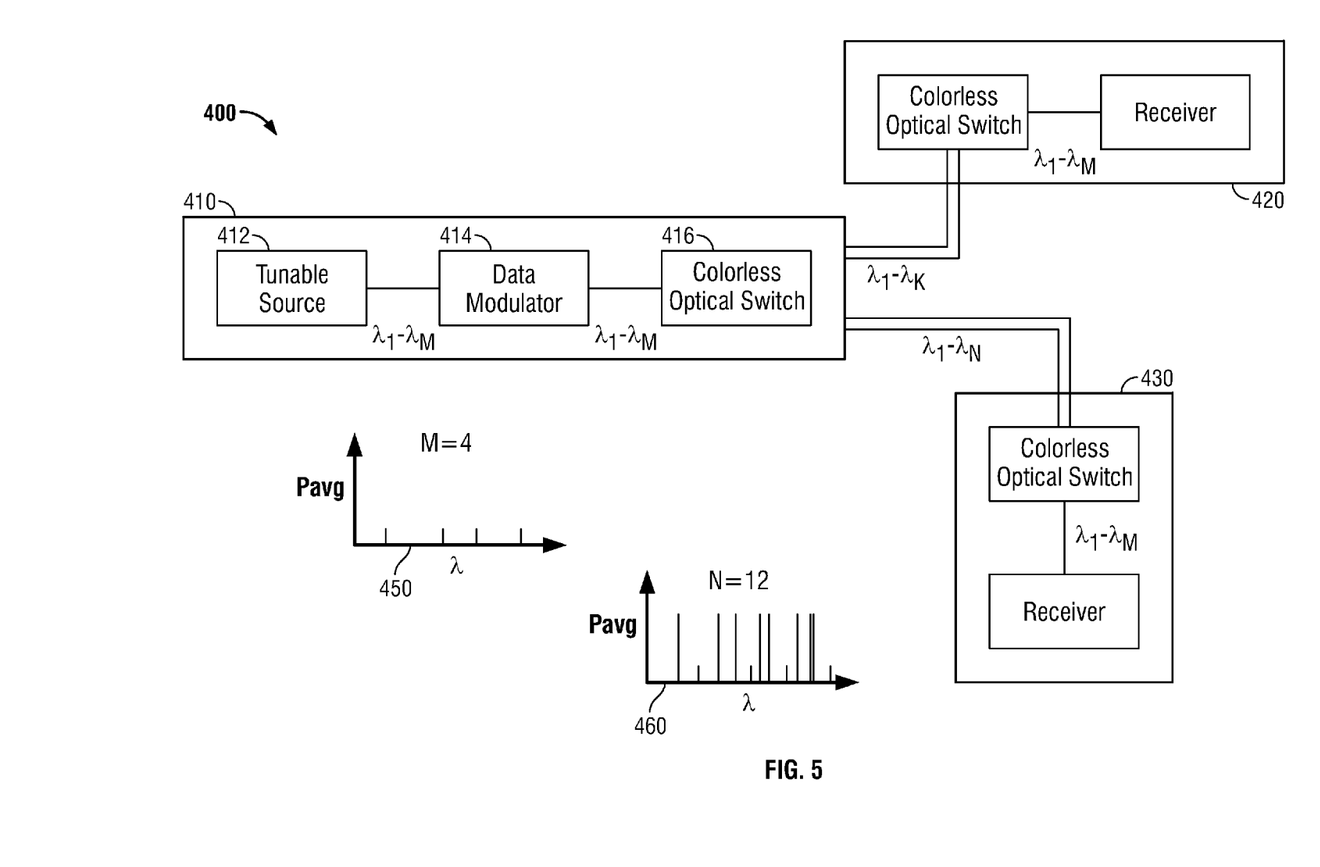
FIG. 5 shows one example of a WDM transmission network that uses fast laser tuning to distribute the power of a single optical signal over M wavelength positions.

In FIG. 5 transmitting node 410 adds the data signal that is distributed over the wavelengths $\lambda_1, \lambda_2 \ldots \lambda_M$ to the main transmission line using the colorless optical switch 416. In particular, tunable source 412 generates optical wavelengths $\lambda_1, \lambda_2 \ldots \lambda_M$ and data modulator 414 modulates the data signal onto the wavelengths $\lambda_1, \lambda_2 \ldots \lambda_M$ in the distributed manner described above. The resulting distributed optical signal (comprising modulated wavelengths $\lambda_1, \lambda_2 \ldots \lambda_M$ as modulated by a common data signal) is added to the transmission link 440 coupled to receiving node 430 along with other optical signals such that N (N>M) wavelength positions are occupied on the transmission link. At a later time, instead of being transmitted to receiving node 430, the distributed optical signal may be directed to receiving node 420 by switching it to another transmission link 450 in which K (K>M) wavelength positions are occupied. The system may be made bi-directional by using a mirror image of the signal paths as is normally done in commercial systems today.

FIG. 5 also shows a graph 450 of the average power as a function of wavelength for the distributed optical signal. The average power is the same for all four wavelengths over which the data signal is distributed. FIG. 5 also shows a graph 460 of the average power as a function of wavelength for the WDM signal transmitted over the link 440 between the transmitting node 410 and the receiving node 430. In this example the WDM signal comprises wavelengths $\lambda_1$, $\lambda_2 \ldots \lambda_k$, where K is illustratively chosen to be 12. As the graph 460 illustrates, the average power of each of the four wavelengths employed in the distributed optical signal is less than the remaining wavelengths that do not have a data signal distributed over them.

In accordance with another aspect, the wavelength routes of the signals may be changed over time in response to changing traffic demands or system requirements. Today, commercial systems fix the signals at a constant wavelength and route them through the network because changing the routes over time will disrupt the other signals in the network. By spreading the data signals across the spectrum as described herein and making them more robust to such disruptions, the routes can now be changed over time.

In accordance with another aspect, the data signals may be distributed over enough wavelength positions such that most or all wavelength positions are occupied in the optical spectrum used for transmission (which is usually determined by the optical amplifier wavelength gain range or the range of wavelength positions provided by the switches in the system). In this way the stability of the system is similar to that of a fully loaded system and is very robust to changes. Additionally, new data signals can be added to the system by modulating them onto a set of optical wavelengths occupying a different wavelength positions.

Figure 6A:
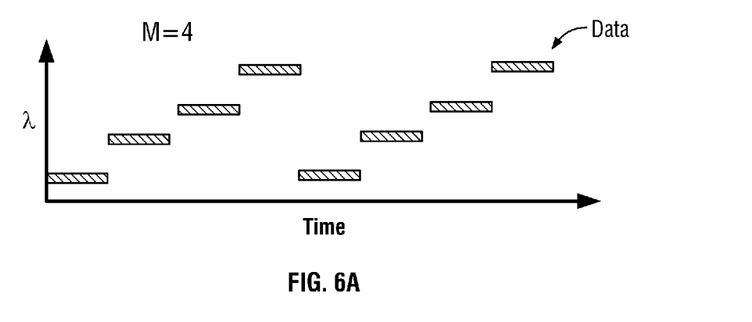
FIG. 6A is a graph similar to the graph of FIG. 1 showing a single data signal being modulated onto 4 optical wavelengths as a function of time.
Figure 6B:
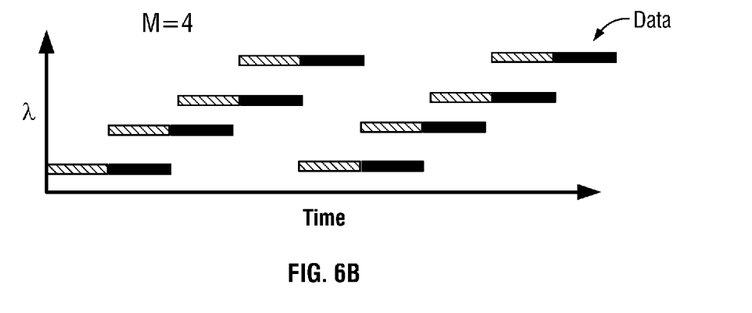
FIGS. 6B and 6C are graphs showing two data signals being modulated onto 4 optical wavelengths as a function of time using two different time-interleaved patterns.

In some implementations new data signals may be introduced to the system by using wavelength positions that are already occupied and time interleaving them with the other existing data signals. One example of such time interleaving is shown in FIG. 6B for two data signals. The second data signal is introduced after the first data signal shown in FIG. 6A has been modulated onto the same four wavelengths. In this way the distribution of optical power across the band can remain constant as the number of data signals changes. In fact, in one implementation every data signal can be distributed over the full range of wavelength positions. Thus if, for example, 80 wavelength positions are available then each data signal can be switched to all 80 positions in the time scale of 1 microsecond or faster than the amplifier response can detect or strongly respond.

In some implementations the data signals are distributed across all or a large portion of the spectrum so that the amplifiers used in the system have a predetermined set of gain tilt values based on the number of wavelengths present on the line. Normally the amplifier gain tilt is adjusted based on both the number of wavelengths and the range of wavelengths that the data signals occupy. By reducing the number of different possible wavelength configurations (in the case of using the full spectrum the wavelength configuration becomes constant), the amplifier tilt becomes only a function of the number of wavelengths. This simplifies and speeds up the amplifier adjustments associated with changing wavelength configurations.

New data signals that are switched to multiple wavelength positions either individually or time interleaved with already present distributed optical signals may be added to the system at full power along the full path or any portion of the path. Currently, new optical signals need to be added gradually starting from low power and increasing slowly and often over small segments of the network at a time in order to allow for all of the slow system controls to adjust and keep everything stable. With the techniques described herein it becomes possible to add the wavelengths rapidly and switch them along new routes rapidly.

Figure 6C:
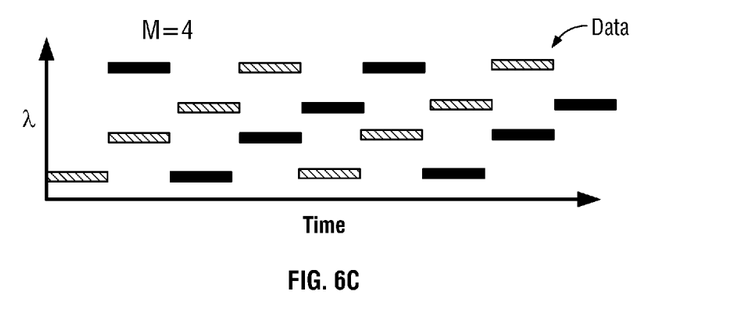

In yet other implementations newly introduced distributed optical signals that are time interleaved with already present distributed optical signals may use a variety of different tuning or interleaving patterns such as the two interleaved patterns shown in FIGS. 6B and 6C, which each interleave two data signals that are modulated onto four wavelengths. As shown, the relative times at which the second data signal is interleaved with respect to the first data signal differs between the two examples. In this way the optical power can be distributed in time to form unique patterns. For example, as shown in the example of FIG. 6C, one such pattern may allow the power to be distributed across the spectrum in a more uniform manner, minimizing the duration over which each wavelength position does or does not have full or partial power. For example, the two data signals can be arranged so that they are modulated onto wavelengths at positions located on opposite sides of the spectrum center at any given point in time.

Figure 7:
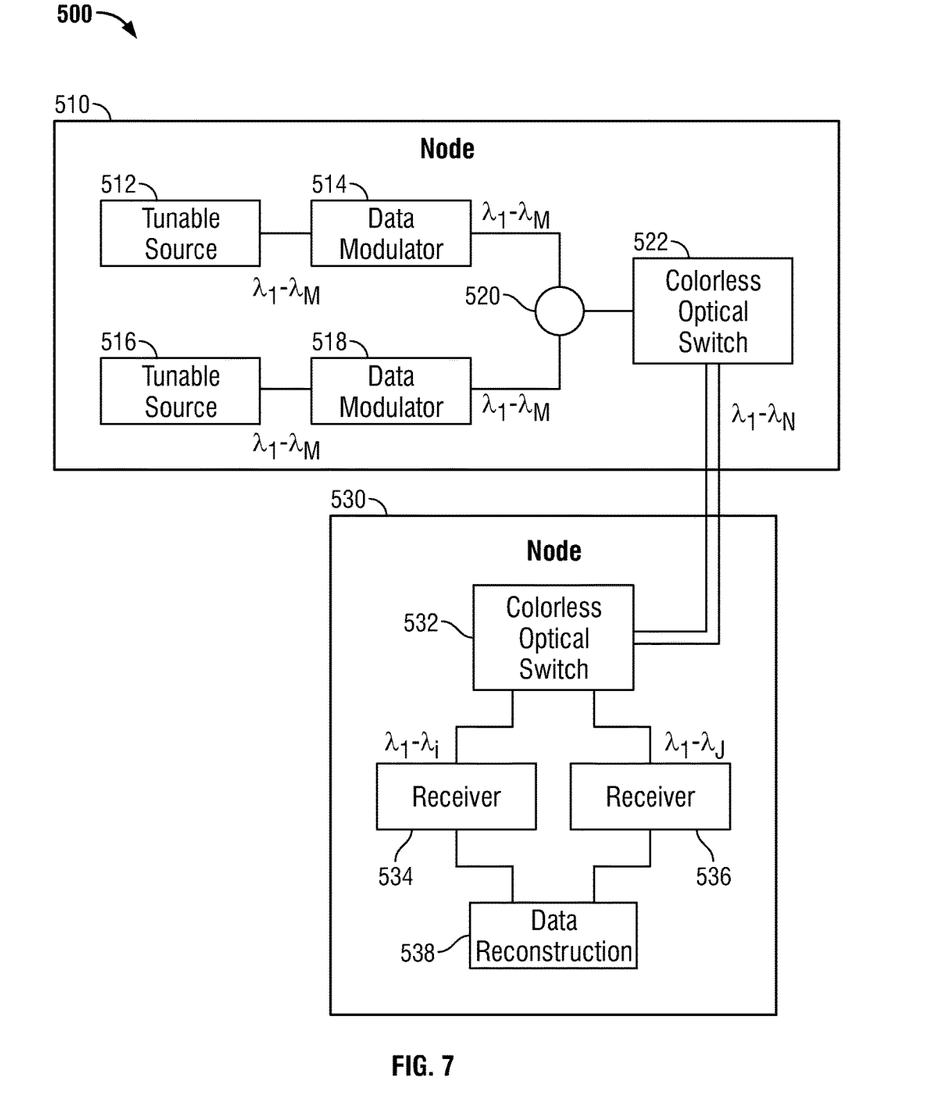
FIG. 7 shows one example of an optical transmission system having a transmitting node and a receiving node in which different distributed optical signals are time interleaved by combining the signals at the source using a passive optical coupler.

In some implementations the different distributed optical signals may be time interleaved by combining the signals at the source using a simple passive optical coupler. Such an arrangement is illustrated in FIG. 7, which shows a simplified optical transmission system 500 having a transmitting node 510 and a receiving node 530. In transmitting node 510 tunable source 512 generates optical wavelengths $\lambda_1$, $\lambda_2 \ldots \lambda_M$ and data modulator 514 modulates a first data signal onto the wavelengths $\lambda_1, \lambda_2 \ldots \lambda_M$ in the distributed manner described herein. Likewise, tunable source 516 generates optical wavelengths $\lambda_1, \lambda_2 \ldots \lambda_M$ and data modulator 518 modulates a second data signal onto the wavelengths $\lambda_1, \lambda_2 \ldots \lambda_M$ in the distributed manner described herein. The wavelengths are provided by the data modulators 514 and 518 to optical coupler 520, which combines them and directs them to optical switch 522. The clocks of the different tunable sources 512 and 516 can be synchronized in order to ensure that they are time-interleaved so that their data signals do not overlap on the same wavelength at the same time. On the receive side the different wavelength positions are divided by the optical switch 532 between the receivers 534 and 536 in such a way that the data going to each receiver only contains data from a single source at any given time. Thus for the interleaved pattern shown in FIG. 6C, for example, the top two wavelengths may be directed to one receiver and the bottom two wavelengths may be directed to the other receiver. The different data streams can then be separated and reconstructed in the electrical domain after the receivers by data reconstruction module 538.

Figure 8:
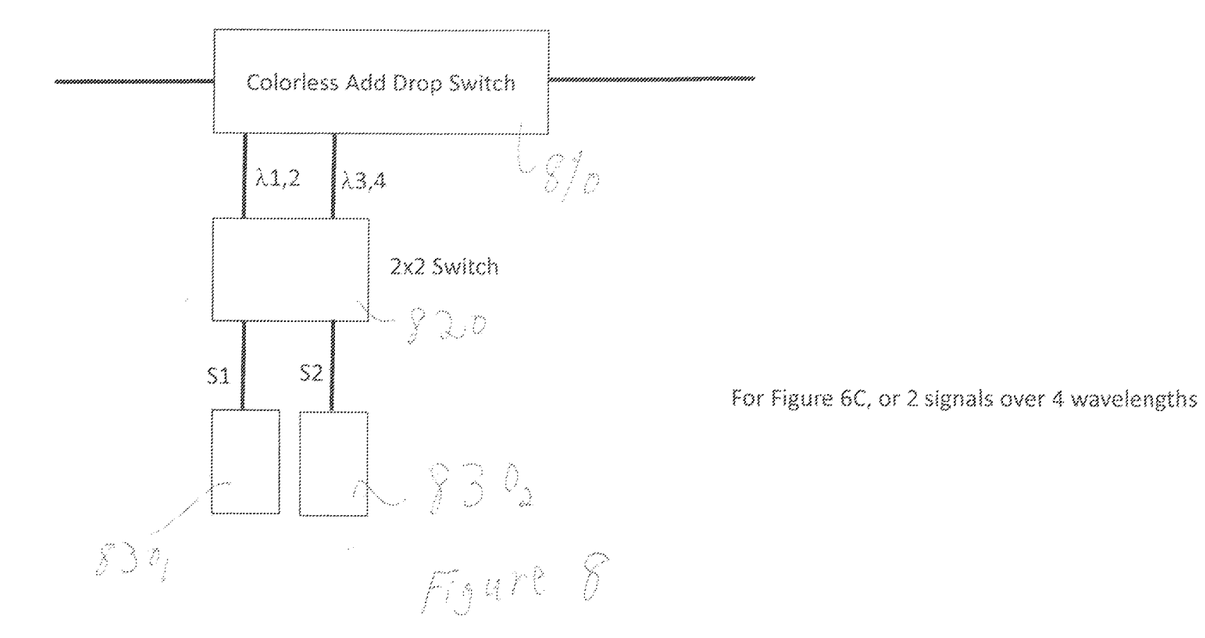
FIGS. 8, 9, 10 and 11 each show examples of a colorless optical switch that may be employed in an optical node dropping modulated wavelengths to various illustrative receiver configurations.
Figure 9:
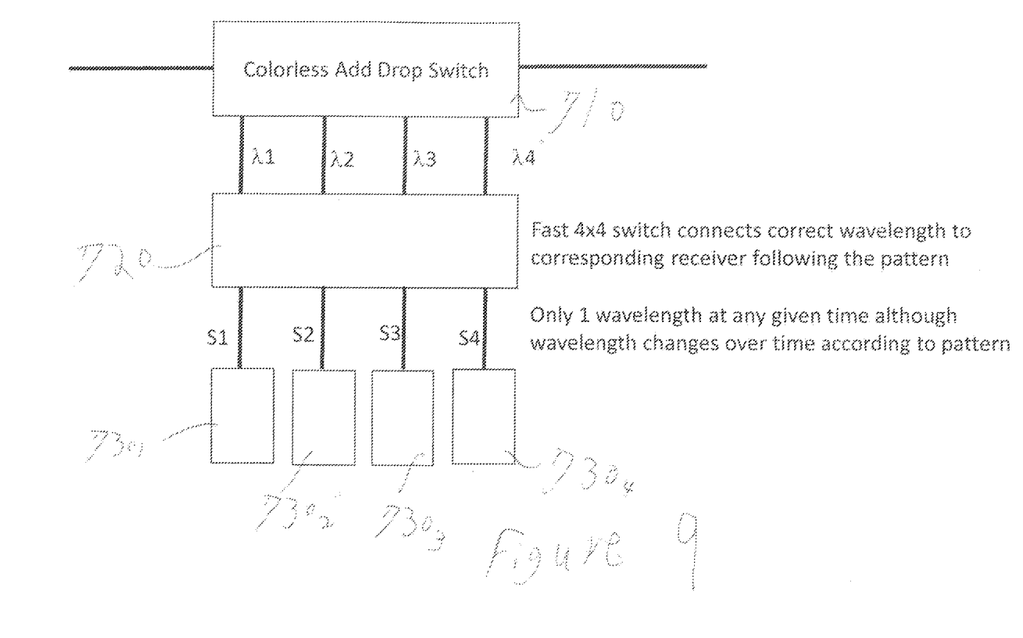

In another implementation, a fast switch may be used at the receiving node to send the signals to one receiver or the other depending on the interleaved pattern that is employed. In the example with 2 signals and 4 wavelength positions, for the pattern in FIG. 6C as described above the same two sets of drop wavelength positions would be used, but a fast 2×2 optical switch would select which receiver to send the data to depending on the time position in the pattern. This implementation is illustrated in FIG. 8, which shows colorless optical switch 810 dropping all 4 wavelengths to a fast 2×2 switch 820, which in turns sends a single wavelength at the appropriate time to each one of the receivers $830_1$ and $830_2$ so that each receiver receives only a single one of the data signals. For arbitrary patterns a 4×2 switch can be used to direct any of the 4 drop wavelengths to one of the 2 receivers. Symmetric combinations can also be used in which 4 tunable sources are used and 4 receivers with a 4×4 switch on the receive side and a 4×1 combiner on the transmit side. Combinations of these 4 transceivers can be turned on and off depending on the required data capacity at any given time. One example of such an implementation is shown in FIG. 9 for 4 data signals that are distributed over 4 wavelength positions in a time interleaved manner. As shown, colorless optical switch 710 drops all 4 wavelengths to a fast 4×4 switch 720. The switch 720 sends a single wavelength at the appropriate time to each one of the receivers $730_1$, $730_2$, $730_3$, $730_4$ so that each receiver receives only a single one of the data signals.

Figure 10:
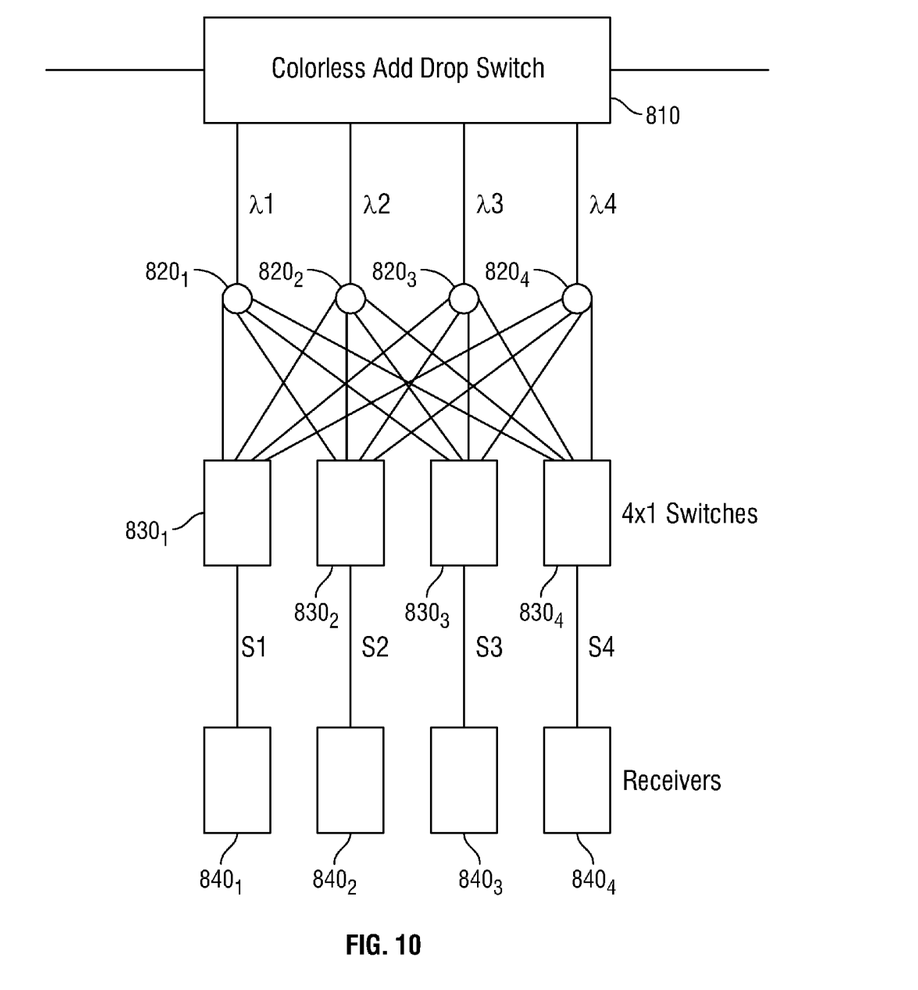

In yet another implementation in which time interleaved signals are employed, each wavelength position may be dropped to a separate fiber on the receive side. The fibers are then split into H copies, where H is the number of signals to be received. One of each copy is sent to each receiver. A 1×M switch is used to select between the different wavelength positions corresponding to the time when the respective signal should be on that wavelength. This 1×M switch could be implemented using, for instance, a 1×M coupler and placing an on-off switch on each of the M branches. The switches would then be off except during the time when the appropriate signal data is present on that wavelength position. Thus, the switches would follow the same tuning pattern used by the source. One example of such an implementation is illustrated in FIG. 10 for 4 data signals that are distributed over 4 wavelength positions. As shown, colorless optical switch 810 drops each wavelength to a respective one of the splitters $820_1$, $820_2$, $820_3$, $820_4$. The splitters $820_1$, $820_2$, $820_3$, $820_4$, in turn each send copy of each wavelength to one of the 4×1 switches $830_1$, $830_2$, $830_3$, $830_4$ to which they are respectively coupled. Each switch $830_1$, $830_2$, $830_3$, $830_4$ sends the appropriate wavelength to the receiver $840_1$, $840_2$, $840_3$, $840_4$ to which it is respectively coupled at the appropriate time so that the each receiver only receives a single data signal.

Figure 11:
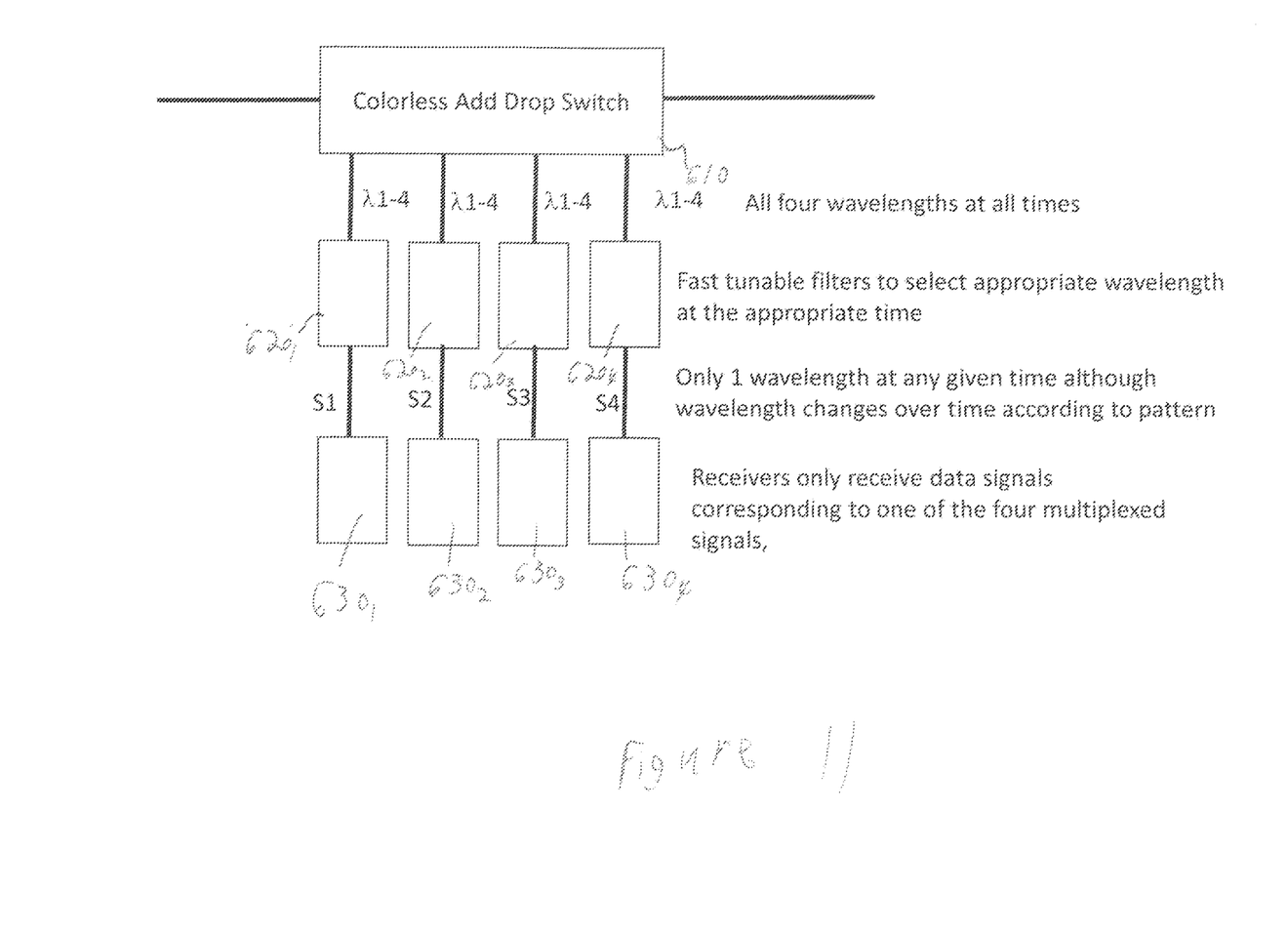

In another embodiment, the receiver could be implemented by dropping all of the wavelength positions to each of the signal receivers (for example by using a splitter to send copies to each receiver (similar to what was done at the transmitter side). A fast tunable receiver could then be used to select the appropriate wavelength position at the appropriate time—following the same pattern as the source tuning. This tunable receiver could be implemented using an optical filter technology such as a MEMS switch with a grating or a tunable FabryPerot filter. Another implementation would be to use a tunable local oscillator if the receiver is coherent. One example of this embodiment is illustrated in FIG. 11 for 4 data signals that are distributed in a time interleaved manner over 4 wavelength positions. As shown, copies of all 4 wavelengths of the distributed optical signal are dropped by colorless optical switch 610 to fast tunable filters $620_1$, $620_2$, $620_3$ and $620_4$. Each filter, in turn, sends the appropriate wavelength at the appropriate time to the receiver $630_1$, $630_2$, $630_3$ and $630_4$ to which it is respectively coupled so that each receiver only receives a single data signal.

In some implementations new data signals may be added to the system by reducing the range or number of wavelength positions to which the existing data signals are tuned. Thus the first data signal might be initially modulated onto 4 wavelengths. When a second data signal is added, the first data signal will be modulated onto a reduced (i.e., 2) number of wavelengths and the new data signal will be modulated onto two other wavelengths. When a third data signal is added, one of the two existing data signals will no longer be distributed over different wavelengths and will simply be modulated onto a single fixed wavelength. The third wavelength will also be modulated onto a single fixed wavelength. Finally when a fourth data signal is added all of the data signals will be modulated on its own single fixed wavelength and no tuning will be performed on any of the four data signals.

One potential complication that may arise in an optical transmission system of the type described herein is that when the data signal is recovered at the receiver, portions of the data signal that have been modulated onto different wavelengths may experience wavelength dependent timing jitter. In some embodiments the bit period phase alignment can be adapted to compensate for this jitter. In particular if the switching pattern among different wavelengths is known then the time when the phase will jump will either be known or can be detected and then a fixed phase offset can be applied each time the jump is made as the data signal is received from different wavelengths. Thus in some implementations the receiver(s) that is employed may be able to perform such phase corrections.

In yet another implementation, rather than tuning the source laser rapidly to multiple wavelength positions, an optical comb source or comb generation technique may be used to generate multiple simultaneous optical carriers at the desired wavelengths. This can be done, for example, by creating a uniform set of comb lines and then blocking all of lines that are not desired. The wavelength positions of these lines can be chosen to minimize the optical power excursions that occur when the new data signal is introduced to the system or when its path is changed. Each of the comb lines that are used are modulated with data signals.

The configuration of the optical system nodes, including but not limited to the tunable sources, data modulators and optical switches contained therein, may be controlled locally at the site of the nodes or remotely (e.g., at a central office or the like). For this purpose one or more controllers or processors may be employed for processing computer executable instructions to control their operation. The computer executable instructions may be provided using any computer-readable storage media, such as a memory of any suitable type.

In the examples discussed above it was stated that the data signal is switched among different wavelength positions at a sufficiently fast rate so that the modulated optical signals each appear to the optical amplifier as having a constant value (a constant average power) at each of the wavelength positions to which the data signal is switched. In some embodiments, however, the modulated optical signals may each appear to the optical amplifier as having a constant value within some margin, e.g., a constant within 1 dB.

As user herein, the term "memory" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

In addition, it should be understood that the figures, which highlight the functionality and advantages of the present invention, are presented for illustrative purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

The invention claimed is:

1. A method for transmitting data over an optical communication system, comprising:
   sequentially tuning a laser beam among a plurality of optical wavelengths;
   modulating at least one data signal onto the plurality of optical wavelengths by sequentially switching the modulation of the data signal among the plurality of optical wavelengths such that at any given time the data signal is only modulated onto a single one of the optical wavelengths; and
   performing the sequential switching at a rate equal to or greater than a response time of one or more optical amplifiers used for amplifying the optical wavelengths.

2. The method of claim 1 wherein the wavelengths onto which the data signal is modulated are distributed across substantially all of an operating bandwidth of the optical amplifier over which the wavelengths are amplified.

3. The method of claim 1 further comprising modulating one or more of the data signals onto wavelengths distributed over the operating bandwidth of the optical amplifier such that a gain tilt of the optical amplifier is a function of a number of data signals being modulated onto the wavelengths and not a distribution of wavelengths over the operating bandwidth.

4. The method of claim 1 wherein the plurality of wavelengths onto which the data signal is modulated includes a sufficient number of wavelengths to occupy all otherwise unused wavelength positions available for transmission over the optical communication system.

5. The method of claim 1 further comprising adding a second data signal by sequentially switching modulation of the second data signal onto optical wavelengths not being modulated by another data signal.

6. The method of claim 1 wherein modulating the data signal onto the plurality of wavelengths includes modulating a plurality of data signals onto the plurality of wavelengths and further comprising sequentially switching the plurality of data signals among the plurality of the wavelengths in a time interleaved manner such that any given wavelength is modulated by only one of the data signals at any given time.

7. The method of claim 6 further comprising combining the plurality of data signals using a passive optical coupler, the plurality of data signals being synchronized with one another so that they are not modulated onto any given wavelength at the same time.

8. The method of claim 1 further comprising adding a second data signal by sequentially switching modulation of the second data signal onto optical wavelengths that are introduced to the system at full power.

9. The method of claim 1 further comprising multiplexing the modulated optical wavelengths to produce a WDM optical signal and transmitting the WDM signal onto an optical transmission path that includes the one or more optical amplifiers.

10. The method of claim 9 further comprising receiving the plurality of modulated optical wavelengths at a node that includes a plurality of receivers, each of the individual receivers receiving only a subset of the plurality of modulated optical wavelengths that collectively only include a single data signal at any given time.

11. The method of claim 9 further comprising:
dropping each of the plurality of modulated optical wavelengths onto a different optical fiber, and splitting the modulated optical wavelengths traveling in each fiber to direct the modulated optical wavelengths to each of a plurality of switches that are each associated with a receiver; and
switching each of the switches so that each of the receivers only receives a portion of each of the modulated optical wavelengths that are modulated by a single one of the data signals.

12. The method of claim 9 further comprising dropping each of the plurality of modulated optical wavelengths to a plurality of receivers each being configured to select a single one of the data signals from the modulated optical wavelengths.

13. The method of claim 1 further comprising adding a second data signal to the system by reducing a number of wavelengths that are being modulated by a first data signal and sequentially switching modulation of the second data signal onto the wavelengths no longer being modulated with the first data signal.

14. The method of claim 13 further comprising adding additional data signals by reducing a number of wavelengths that are being modulated by the first and second data signals and sequentially switching modulation of the additional data signals onto the wavelengths no longer being modulated with the first and second data signals.

15. The method of claim 1 further comprising generating the optical wavelengths with a tunable laser.

16. The method of claim 1 wherein the optical amplifier is a rare-earth doped optical amplifier.

17. The method of claim 15 wherein the rare-earth doped optical amplifier is an erbium-doped optical amplifier.

18. An optical node for use in an optical communication system, comprising:
an optical source for generating a plurality of optical wavelengths;
a data modulator for modulating a data signal onto the plurality of optical wavelengths by sequentially switching the data signal among each of the optical wavelength such that at any given time the data signal is only modulated onto a single one of the optical wavelengths, the sequential switching being performed at a rate equal to or greater than a response time of any of one or more optical amplifiers employed along an optical transmission path over which the optical node communicates; and
an optical multiplexing arrangement for multiplexing the modulated optical wavelengths to produce a WDM optical signal and for transmitting the WDM optical signal onto the optical transmission path.

19. The optical node of claim 18 wherein the optical multiplexing arrangement includes an add/drop multiplexer.

20. The optical node of claim 18 wherein the optical multiplexing arrangement includes an optical switch.

21. The optical node of claim 18 wherein the optical switch includes a reconfigurable optical add drop multiplexer (ROADM).

22. The optical node of claim 21 wherein the ROADM is a colorless ROADM.

23. The optical node of claim 18 wherein the optical amplifier is a rare-earth doped optical amplifier.

24. The optical node of claim 23 wherein the rare-earth doped optical amplifier is an erbium doped optical amplifier.

25. The optical node of claim 18 wherein the optical source includes a tunable laser.

26. The method of claim 1 wherein performing the sequential switching at a rate equal to or greater than a response time of the one or more optical amplifiers used for amplifying the optical wavelengths is performed such that the modulated optical wavelengths are each treated by the one or more optical amplifiers as having a constant value within a prescribed margin.

27. The method of claim 26 wherein the prescribed margin is 1 dB.

* * * * *